United States Patent [19]
Brown

[11] 3,783,217
[45] Jan. 1, 1974

[54] HIGH FREQUENCY PRESS WITH CAPACITIVE TUNING

[75] Inventor: Terence J. Brown, Wigston, England
[73] Assignee: USM Corporation, Boston, Mass.
[22] Filed: Feb. 14, 1972
[21] Appl. No.: 226,118

[30] Foreign Application Priority Data
Feb. 19, 1971  Great Britain ................... 4,994/71

[52] U.S. Cl. ........................... 219/10.53, 219/10.81
[51] Int. Cl. ...................... B23k 13/02, H05b 9/04
[58] Field of Search ................. 219/10.53, 10.55, 219/10.67, 10.81

[56] References Cited
UNITED STATES PATENTS
3,571,550   3/1971   Rose .............................. 219/10.53
2,522,823   9/1950   Hayes et al. ..................... 219/10.53

Primary Examiner—J. V. Truhe
Assistant Examiner—Hugh D. Jaeger
Attorney—Richard B. Megley et al.

[57] ABSTRACT

A press for applying high frequency welding and cutting energy to a workpiece placed between platens of the press, at either of two work stations at each of which the platens apply pressure and high frequency energy to the workpiece, has control means for independently tuning a generator of the high frequency energy to selected conditions at each work station. A parallel plate capacitor associated with the generator for the high frequency energy has a capacitance adjustable by changing the spacing between the parallel plates to tune the generator. The plates are urged toward each other by a spring and separated from each other by tension in a cable secured to the spring-movable plate. Means for controlling the cable include a camming member and adjustable stop means for shifting the cable in response to the work station locations of the platen to independently adjust the capacitance at each work station.

3 Claims, 3 Drawing Figures

HIGH FREQUENCY PRESS WITH CAPACITIVE TUNING

BACKGROUND OF THE INVENTION

Modern industrial operations have increasingly relied on high frequency welding and cutting presses to perform a variety of operations on a range of materials. High frequency welding and cutting presses generally engage a workpiece between platens of a press which apply pressure and high frequency energy to the workpiece. One type of workpiece material which responds favorably to such high frequency treatment is that which is softenable by heat generated in the material by the high frequency energy. The heat softened material may then be cut, welded together or embossed by dies placed between the platens. Polyvinyl chloride and other thermoplastic materials frequently exhibit such high frequency activation.

The operation of high frequency generators providing energy to many types of high frequency presses is affected by a variety of different conditions related to the operation of the press. Among these conditions are the distance separating the platens of the press when high frequency energy is supplied to a workpiece, usually a function of workpiece thickness, and the particular material from which the workpiece is made. If a die is required for the particular high frequency operation, the thickness of the die further affects the distance separating the platens. The particular die material still further affects the operation of the high frequency generator.

It is known that adjustment to the high frequency generator may be made to match the impedance or tune the output of the high frequency generator to the particular spacing, material and other conditions at the platens of the press so as to maximize the high frequency energy supplied to the workpiece from the generator. Such tuning is difficult to achieve for the wide variety of conditions which may be encountered in industrial use of a high frequency press. Accordingly, tuning is often accomplished only after a series of similar pieces have been operated upon by the press.

In many industrial applications, however, it is inconvenient to have the press limited to operations upon one series of articles at a time. For example, in operating upon two different types of workpieces which are later to be assembled into a single article, such use of the press requires operating on all of one type of workpiece before work may be started on the other complemental workpieces. Production of the finished article must therefore await the entire production run of one type workpiece, or a second press must be employed. The productivity of such a system is unnecessarily restricted and undesirably low for industrial application.

Productivity of high frequency presses can be increased by a press having a platen movable between two work stations so that an operator may set up one station while the press is supplying high frequency energy and pressure to a workpiece at the other. Such a press is described in U.S. Pat. No. 3,571,550 issued Mar. 23, 1971, in the name of Rose, et al. To further increase the productivity of the press described in the above cited patent, means for independently tuning the high frequency generator for operation at each work station were provided.

The tuning means in the above recited patent is a transformer having an output winding tapped at varying numbers of turns connecting the high frequency generator and the platens of the press. A switch selects a particular tap of the secondary winding for connection to the platens of the press. This method of tuning the high frequency generator to conditions at the platens of the press is limited to the number of taps provided on the secondary winding of the transformer. A further limitation resulted from the high cost of high frequency transformers.

Another known system for tuning a high frequency generator to particular conditions at the platens of a press is to appropriately vary an electronic component of the high frequency generator. For example, a parallel plate capacitor in an output circuit of the generator may have its capacitance varied by varying the spacing of the parallel plates of the capacitor. For this purpose it is known to use a Bowden cable arrangement in which the tension in a cable connecting a movable plate of the capacitor and a frame of the machine is modified to move the plate of the capacitor. This arrangement permits more continuous tuning of the generator than the transformer arrangement but is not readily adapted to be automatically set to a predetermined condition at each station of a multi-station press.

Where it is desired to use a two-station welding and cutting press, it is additionally desirable to be able to independently tune the generator to the operating condition of the press platens at each of the work stations. It is further desirable that the high frequency generator be, in effect, automatically tuned to a preset condition in response to movement of the platen from one station to another.

SUMMARY OF THE INVENTION

Accordingly, it is an object of the invention to provide apparatus for tuning a high frequency generator to independent, predetermined condition in response to movement of platens of a press from one work station to another.

To this end, the invention provides means responsive to transverse movement of a platen from one work station to another in a press of the type described in the above recited patent to independently and automatically tune the high frequency generator to a predetermined condition at each work station of the press. A movable plate of a capacitor in the generator is urged by a spring toward a second plate of the capacitor. The movable plate is connected to a cable secured at the other end to a frame of the machine. A Bowden cable arrangement comprising a pulley in engagement with the cable is movable to tension the cable to shift the movable plate of the capacitor. The movable pulley is connected to a lever pivoted about a common axis with the pulley. The lever is positioned to engage a pair of adjustable stop members for preselecting a position of the lever, pulley and cable and, hence, of the capacitor plate connected to the cable. A camming member secured to the movable platen of the press is adapted to engage an extended portion of the lever at the work station location of the platen to move the lever to move the capacitor plate to one of the preselected positions and to disengage the lever when the platen is at another work station to permit the lever and capacitor plate to move to the other preselected position under the urging of the spring. The plates of the capacitor are thus adjusted to a preselected position in response to movement of the platen of the press from one work station

3 to another to independently tune the generator at each platen work station.

DESCRIPTION OF THE DRAWINGS

A preferred embodiment of the invention which is illustrative of and not a limitation on the invention will now be described with reference to the drawings, in which.

DESCRIPTION OF THE PREFERRED EMBODIMENT

Figure 1:
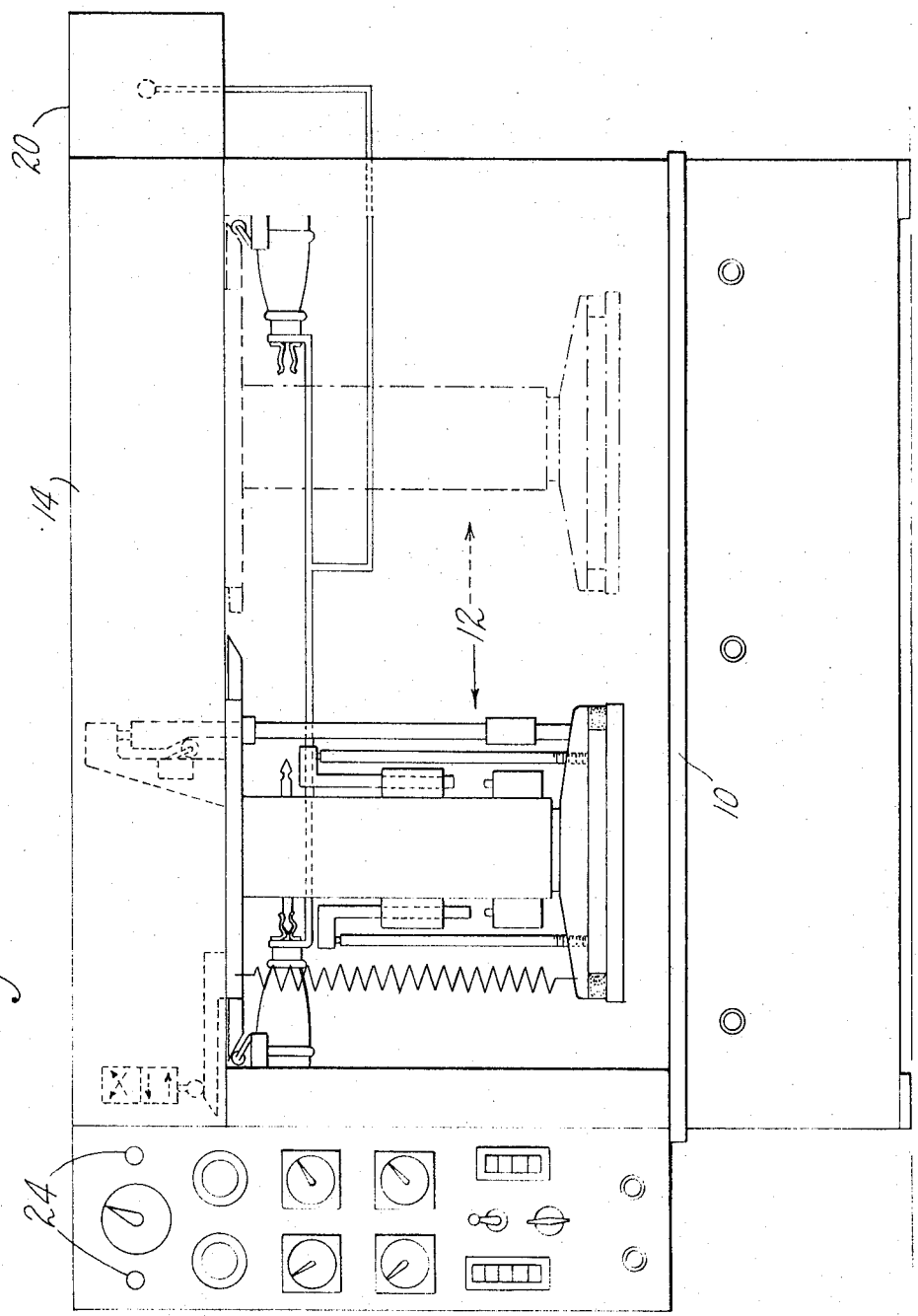
FIG. 1 is a front view of a two-station high frequency welding and cutting press having means for independently tuning the generator in response to movement of a platen to each work station.

A high frequency press of the general type described in the above mentioned patent is shown in FIG. 1. The press has a lower platen 10 extending across the press and an upper platen generally indicated at 12 mounted on a frame 14 of the press for movement from a first work station on the left to a second work station on the right and shown in phantom. At each work station the upper platen communicates with a high frequency generator 20. A control, generally indicated at 22, is effective to control the movement of the platen 12 of the press and to control the high frequency energy supplied from the generator to the platen of the press at each work station of the platen. For controlling the high frequency energy, the control is provided with knobs 24 which respectively control the high frequency energy supplied to the platen at the work stations.

Figure 2:
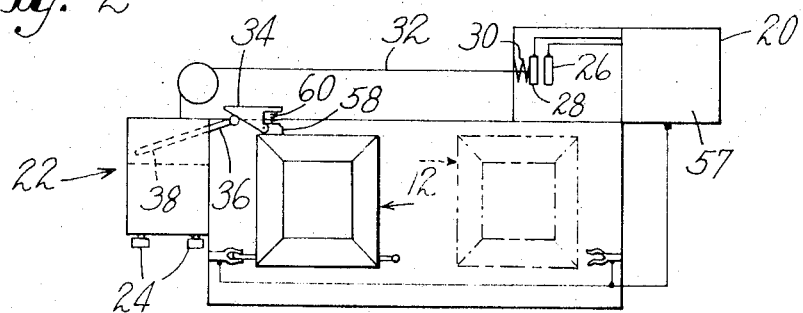
FIG. 2 is a top schematic view of the press shown in FIG. 1.

FIG. 2 is a top schematic view of the press in which the high frequency generator 20 is shown to include a capacitor having a fixed plate 26 and a parallel, movable plate 28 for varying the spacing between the plates and hence the capacitance of the capacitor. The movable plate is mounted on a compression spring 30 which urges the plate toward the fixed plate and is connected to a cable 32 an opposite end segment of which enters the control 22. The movable platen 12 is provided with a camming member 34 (FIGS. 2, 3) movable with the platen into engagement with an extended portion 36 of the lever 38 when the platen 12 is in the first, left-hand work station and out of engagement with the lever portion when the platen is at the second, right-hand work station as seen in FIG. 2.

Figure 3:
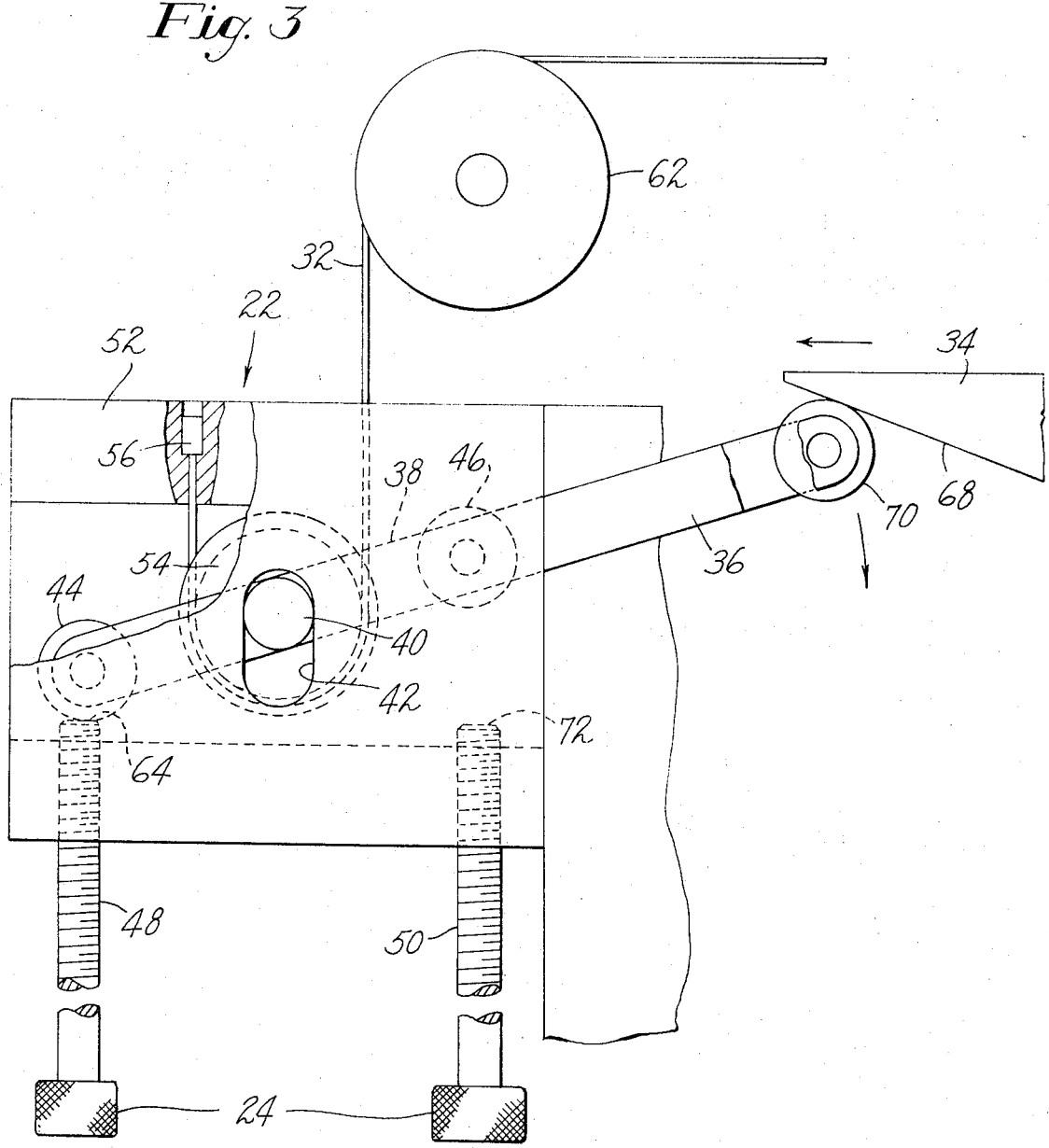
FIG. 3 is a top view on a larger scale of a portion of the means for tuning the generator of the press shown in FIG. 1.

Referring now to FIG. 3, the extended portion 36 of the lever 38 is mounted on a pivot 40 slidably supported in slots 42 in spaced vertical sheet members forming a part of the control 22. Abutment rollers 44 and 46 are secured to the lever at equal distances from but on opposite sides of the pivot 40. The abutment rollers 44 and 46 are respectively mounted for engagement with lower stop members 48 and 50, and an upper block 52 separating the sheet members on which the lever is mounted. A pulley 54 is mounted for rotation about the pivot 40 and receives the cable 32 extending from the capacitor. The cable passes around the pulley and is secured by anchor 56 to the block 52.

When the platen 12 is at the first work station, the camming member 34 engages the extended portion 36 of the lever to rotate the lever clockwise (FIG. 3) to move the abutment roller 46 toward the stop member 50 and the abutment roller 44 into engagement with the block 52. After initial lost motion while the abutment roller 44 engages the block 52, the camming member continues to move the lever clockwise by sliding the pivot 40 and the connected pulley 54 toward the stop members or downward as seen in FIG. 3. Movement of the pulley varies the effective length of the path of the cable from its anchor 56 in the block 52 to the generator 20 and hence tensions the cable to pull the plate 28 of the capacitor to change the capacitance of the capacitor.

When the platen 12 is at the second work station, the camming member 34 is out of engagement with the lever 36 and the spring 30 urges the movable plate of the capacitor toward the other to tension the cable to draw the abutment roller 46 into engagement with the block and the abutment roller 44 into engagement with the stop member 48. As the lever 36 shifts the abutment rollers into these engagements, the pivot 40 slides with the pulley toward the block 52. Selection of the position of the stop members is thus effective to determine or preselect the position of the movable plate 28 of the capacitor and thus to preselect the capacitance.

Returning to FIG. 2, high frequency generator 20 comprises an electronic circuit 57 for generating the high frequency energy for communication to the press. The generator circuit may be of any of a number of well known designs, such as a Hartley oscillator, having a connected output circuit including the capacitor composed of plates 26 and 28. The output circuit will tune or match the apparent impedence of the generator with that of the press when it operates upon a particular workpiece at a work station of the press. Adjustments in the spacing of the capacitor plates is thus effective to tune the generator for particular conditions of the press. In an alternative embodiment, the capacitor composed of plates 26 and 28 may be in a tank or resonant circuit for the generator which also serves as an output from the generator. The circuit is still designed such that varying the space between the plates of the capacitor will vary the capacitance so as to tune the generator to particular conditions of the press.

As described in the above mentioned patent the control 22 is effective to select the work station and certain other operating conditions of the press, including initiation of high frequency energy supply. The control is also provided with means for timing both the application of pressure and high frequency energy to a workpiece on the lower platen.

In addition the control is now provided with the knobs 24 which may be rotated to tune the generator to particular conditions at a work station of the press. So long as the particular conditions remain the same, that is, so long as similar workpieces are successively operated upon by the press, the conditions at the platens will remain the same and the press will remain tuned to the generator as preselected by rotation of the knob 24 of the control.

As already described, the camming member 34 engages the extended portion 36 of the lever 38 in the first work station location of the platen to move the lever 38 to tune the generator. The extent of movement of the lever is varied by rotation of the knobs 24; however, the lateral position of the platen 12 at the left-hand work station remains the same. Thus, the camming member may jam against the extended portion of the lever if the platen 12 has not reached the work station when movement of the lever is stopped. To prevent such jamming, the camming member 34 is pivotally mounted upon a rearward extension 58 of the platen 12. A spring 60 also connects the platen extension and the camming member to resiliently hold the camming member in its operative position until the lever 38 engages one of the stop members and then yields to permit the camming member to rotate about its pivot to prevent jamming of the camming member and lever.

The path of the cable from the movable plate 28 of the capacitor to the anchor 56 includes a direction changing pulley 62 which has a fixed axis and directs the cable toward the movable pulley 54 as seen in FIG. 3. Tension in the cable from the urging of the spring 30 on connected plate 28 draws the movable pulley 54 toward the block 52. The common connection of the pulley and the lever 38 to the pivot 40 draws the lever into the position shown in FIG. 3 when the spring draws the movable pulley toward the block. The abutment roller 44 then engages the stop member 48 while the abutment roller 46 engages the block 52 to prevent further counterclockwise movement of the lever and movable pulley 54. The stop member 48 is threadably engaged with a frame of the press and connected to one of the knobs 24 so that rotation of the knob 24 selects the position of an end 64 of the stop member 48 to preselect the position of the lever and movable pulley and hence of the movable plate 28 of the capacitor. The capacitance of the capacitor at the second work station is thus preselected by rotation of the knob 24.

When the platen 12 moves to the left-hand work station as seen in FIG. 2, an inclined surface 68 of the camming member 34 engages a third abutment roller 70 secured to the extended portion 36 of the lever to rotate the lever about its pivot 40 until the abutment roller 46 engages the stop member 50 and the abutment roller 44 engages the block 52. As the lever rotates about the pivot, the pivot 40 also slides in the slots 42 to move the movable pulley 54, also mounted on the pivot 40, away from the block 52. Movement of the movable pulley away from the block increases the effective length of the path of the cable 32 from the anchor 56 to the generator 20 to increase the spacing between the plates of the capacitor to vary its capacitance. The extent of movement of the movable pulley 54 in the slots 42 is determined by the position of an abutment surface 72 of the stop member 50 which member is threadably engaged with a frame of the machine and connected to a knob 24. Rotation of a knob 24 thus selects the position of the abutment surface 72 to preselect a spacing of the plates and the capacitance of the capacitor. Thus, at both work stations of the press the spacing and capacitance of the parallel plates 26 and 28 of the capacitor are independently preselected by rotation of one of the knobs 24 and adjusted in response to the work station location of the platen 12.

Having thus described my invention, what I claim as new and desire to secure by Letters Patent of the United States is:

1. A press comprising: a platen movable from a first to a second work station, another cooperative platen, a high frequency generator electrically connected to the platens, the generator having a capacitor, the capacitance of which is variable by changing the spacing between a fixed and a movable plate in spaced relation with each other to tune the generator with a predetermined capacitance value at a work station of the press, and means responsive to movement to and arrival of the movable platen at each work station location for spacing of the capacitor plates in the high frequency generator to provide a predetermined capacitance value.

2. A press as in claim 1 wherein the plate spacing means comprises a movable stop member operative on the movable plate for selecting a predetermined capacitor plate spacing for a station and a lost motion mechanism operable by platen movement to and arrival at a work station for moving the movable capacitor plate to the stop member selected spacing from the other plate.

3. A press as in claim 1 wherein the control means comprises: a lever mounted on a slidable pivot; adjustable limit stops engageable by the lever, a pulley rotatably mounted on the pivot, a cable anchored to the press at one end, passing about the pulley and secured to the movable plate of the capacitor at the other end; and a camming member mounted on the movable platen of the press for engagement with the lever at a work station location of the platen to rotate the lever on the pivot and to slide the pivot as permitted by the stops to move the pulley, to tension the cable to shift the movable capacitor plate.

* * * * *